US008743206B2

(12) United States Patent  
Lynam et al.

(10) Patent No.: US 8,743,206 B2  
(45) Date of Patent: Jun. 3, 2014

(54) INDICATOR SYSTEMS IN BEAM COMBINER ASSEMBLIES

(75) Inventors: Jeff Ronald Lynam, Roanoke, VA (US); Scott Joseph Adams, Roanoke, VA (US)

(73) Assignee: Exelis, Inc., McLean, VA (US)

( * ) Notice: Subject to any disclaimer, the term of this patent is extended or adjusted under 35 U.S.C. 154(b) by 492 days.

(21) Appl. No.: 12/872,363

(22) Filed: Aug. 31, 2010

(65) Prior Publication Data

US 2012/0050538 A1 Mar. 1, 2012

(51) Int. Cl.
  *H04N 5/30* (2006.01)
  *H04N 5/335* (2011.01)

(52) U.S. Cl.
  USPC .......................................... 348/162; 348/164

(58) Field of Classification Search
  USPC ................................................ 348/162, 164
  See application file for complete search history.

(56) References Cited

U.S. PATENT DOCUMENTS

| | | | |
|---|---|---|---|
| 4,741,608 A | 5/1988 | Kastendieck | |
| 5,077,813 A | 12/1991 | Dorsel | |
| 5,943,174 A | 8/1999 | Bryant | |
| 6,081,373 A | 6/2000 | Bryant | |
| 6,088,165 A * | 7/2000 | Janeczko et al. | 359/629 |
| 2007/0235634 A1* | 10/2007 | Ottney et al. | 250/214 VT |

FOREIGN PATENT DOCUMENTS

| | | |
|---|---|---|
| DE | 3727552 A1 | 3/1989 |
| EP | 1801633 A1 | 6/2007 |
| EP | 1883227 A2 | 1/2008 |
| EP | 2138885 A1 | 12/2009 |
| WO | WO-03104877 A1 | 12/2003 |

OTHER PUBLICATIONS

International Application Serial No. PCT/US2011/049848, Partial International Search Report mailed Nov. 29, 2011, 5 pgs.
International Application Serial No. PCT/US2011/049848, International Search Report mailed Feb. 6, 2012, 13 pgs.
International Application Serial No. PCT/US2011/049848, International Written Opinion mailed Feb. 6, 2012, 12 pgs.
International Preliminary Report for International Application Serial No. PCT/US2011/049848, Andre Hornung, Authorized Officer for WIPO, Mar. 14, 2013.

* cited by examiner

*Primary Examiner* — Geepy Pe  
(74) *Attorney, Agent, or Firm* — RatnerPrestia

(57) ABSTRACT

A beam combiner is configured to generate a combined image by combining a first image and a second image, and transmit the combined image to a user. One or more light pipes are coupled to the beam combiner from one or more indicator lights. Each light pipe is configured to receive light from a respective indicator light and transmit the light from the respective indicator light to the beam combiner, which is then seen by the user.

14 Claims, 7 Drawing Sheets

INDICATOR SYSTEMS IN BEAM COMBINER ASSEMBLIES

FIELD OF THE INVENTION

The present invention is related to night vision devices, and more particularly, to indicator systems in night vision devices.

BACKGROUND OF THE INVENTION

Night vision devices are commonly used by military or law enforcement personnel for conducting operations in low light or night conditions. Night vision devices may include one or more image sources for providing an enhanced image to the user. It may be desirable to provide internal indicator lights on the night vision device to indicate the status of the one or more image sensors or illuminators. There exists a need for an improved approach to visually inform the user of the status of his night vision device.

SUMMARY OF THE INVENTION

Aspects of the present invention are directed to indicator systems for night vision devices.

In accordance with one aspect of the present invention, a beam combiner assembly is disclosed. The beam combiner assembly is for use with a night vision device. The beam combiner assembly includes a beam combiner and one or more light pipes. The beam combiner is configured to generate a combined image by combining a first image and a second image. The beam combiner is further configured to transmit the combined image to a user. The one or more light pipes are coupled to the beam combiner in positions corresponding to one or more indicator lights. Each light pipe is configured to receive light from a respective indicator light. Each light pipe is further configured to transmit the light from the respective indicator light to the beam combiner.

In accordance with another aspect of the present invention, a night vision device is disclosed. The night vision device includes a beam combiner, a first image source, a second image source, a microdisplay, a display connector, and one or more light pipes. The beam combiner is configured to generate a combined image by combining a first image and a second image. The beam combiner is further configured to transmit the combined image to a user. The first image source is configured to generate the first image and transmit the first image to the beam combiner. The second image source is configured to generate the second image. The microdisplay is configured to transmit the second image to the beam combiner. The display connector is coupled to the microdisplay. The display connector includes one or more indicator lights. The one or more light pipes are coupled to the beam combiner and correspond to the one or more indicator lights. Each light pipe is configured to receive light from a respective indicator light when the display connector is coupled to the microdisplay. Each light pipe is further configured to transmit the light from the respective indicator light to the beam combiner when the display connector is coupled to the microdisplay.

In accordance with still another aspect of the present invention, a night vision device is disclosed. The night vision device includes a beam combiner, a first image source, a second image source, and a micro display. The beam combiner is configured to generate a combined image by combining a first image and a second image. The beam combiner is further configured to transmit the combined image to a user. The first image source is configured to generate the first image and transmit the first image to the beam combiner. The second image source is configured to generate the second image. The microdisplay is configured to transmit the second image to the beam combiner. The microdisplay comprises a substrate including one or more indicator lights. The one or more indicator lights are positioned on the substrate such that the one or more indicator lights transmit light to the beam combiner.

BRIEF DESCRIPTION OF THE DRAWINGS

The invention may be best understood from the following detailed description when read in connection with the accompanying drawings. It is emphasized that, according to common practice, the various features of the drawings are not to scale. On the contrary, the dimensions of the various features may be arbitrarily expanded or reduced for clarity. Included in the drawings are the following figures.

DETAILED DESCRIPTION OF THE INVENTION

The exemplary systems disclosed herein are suitable for providing indicators to a user of a night vision device. Night vision devices for use with the present invention may be monocular or binocular. Suitable night vision devices may be mounted to the helmet worn by a user. Alternatively, suitable night vision devices may include handheld devices, or may include weapon-mounted devices.

The exemplary systems disclosed herein may be particularly suitable for use with night vision devices having at least two image sources (e.g., fused imaging systems). For example, one image source may comprise an image intensifier tube that converts visible and near infrared light into viewable images. The intensifier tube amplifies a low light level image and presents an amplified image on its output surface. Additionally or alternatively, one image source may comprise a thermal imaging camera or detector to detect infrared radiation. Thermal imaging cameras are responsive to different portions of the infrared spectrum and are often referred to as infrared cameras, thus providing information to the viewer outside of the visible light range. In an exemplary embodiment, a night vision device combines images from an image intensifier tube and from an infrared camera to provide an enhanced image to the user.

The exemplary systems disclosed herein may also be particularly suitable for providing visual indicators, i.e. light from indicator lights, to a user regarding the status of the night vision device. For example, it may be desirable to display a visual indication when one or more of the image sources has a low battery. Also, it may be desirable to display an indication for illumination of IR laser diodes used for pitch black illumination, and for signaling that may expose the presence of the user against a night vision capable enemy. Additionally, it may be desirable to display a visual indication when one of the image sources, e.g. an infrared camera, is active or inactive or is not functioning properly. Exemplary night vision devices for use with the present invention may include any or all of the above indicators. Other suitable visual indicators will be understood by one of ordinary skill in the art from the description herein.

Figure 1:
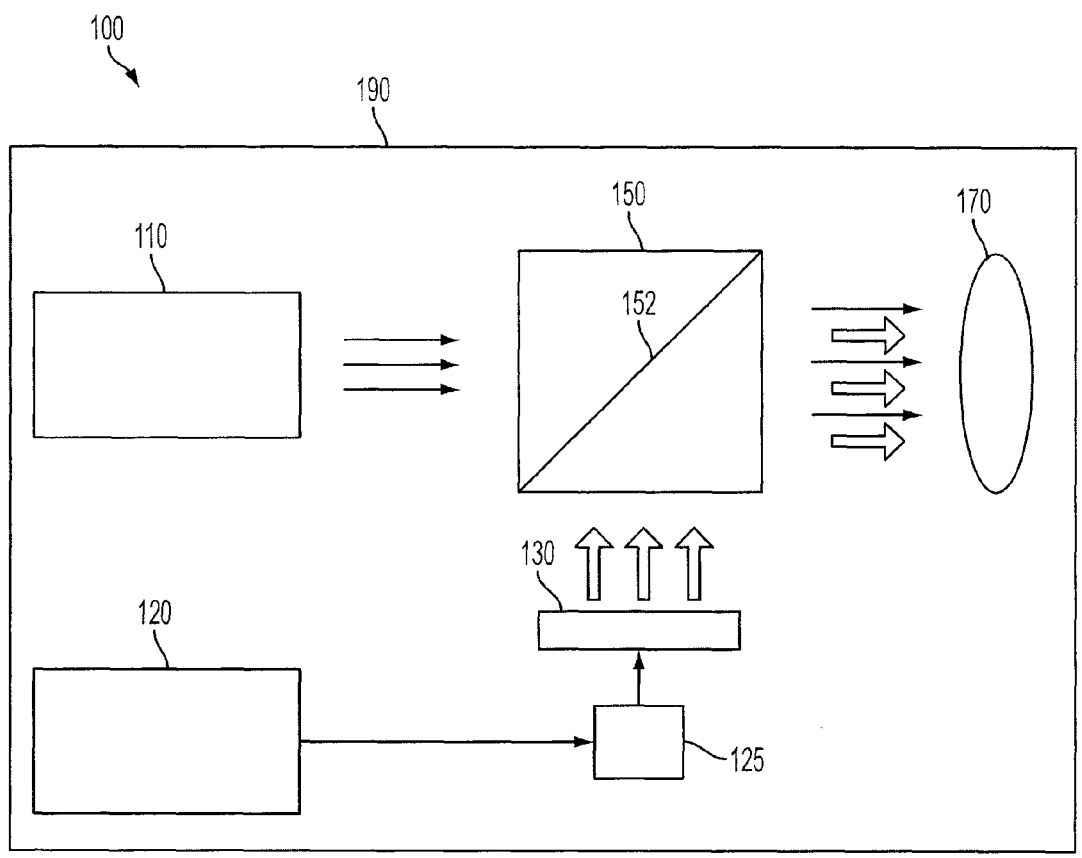
FIG. 1 is a block diagram of an exemplary night vision device in accordance with aspects of the present invention.

Referring now to the drawings, FIG. 1 illustrates an exemplary night vision device 100 in accordance with aspects of the present invention. As an overview, night vision device 100 generally includes a first image source 110, a second image source 120, a microdisplay 130, a beam combiner 150, and a user optical output 170. Night vision device 100 may further comprise a housing 190 for housing the above elements. Additional details of night vision device 100 are described below.

First image source 110 generates a first image and transmits the first image to beam combiner 150. In an exemplary embodiment, first image source 110 is an image intensifier tube. The image intensifier tube may include optical components such as an objective lens assembly configured to focus visible and near infrared light from a field of view of the night vision device 100 onto the image intensifier tube. The image intensifier tube includes a photo-cathode that converts the light photons to electrons, a multi-channel plate that accelerates and multiplies the electrons, and a phosphor screen that receives the accelerated electrons and creates a luminance in response to the accelerated electrons. As indicated by arrows in FIG. 1, the image created by image intensifier tube is transmitted toward beam combiner 150. Suitable image intensifier tubes for use as first image source 110 include, for example, the MX-10160 and MX-11769 image intensifier tubes, provided by ITT Night Vision.

Second image source 120 generates a second image and transmits the second image by way of a microdisplay 130 to beam combiner 150. In an exemplary embodiment, second image source 120 is a long wave infrared (LWIR) or a short-wave infrared (SWIR) camera in communication with the microdisplay 130. An infrared camera may incorporate optical components such as an objective lens configured to focus infrared radiation from the field of view of the night vision device 100 onto a thermal sensor. The thermal sensor outputs a signal corresponding to the infrared image, and transmits the signal to an electronics system 125 for the infrared camera. The electronics system 125 receives the output signal from the thermal sensor and projects a corresponding thermal image onto the infrared camera microdisplay 130.

As indicated by arrows in FIG. 1, the infrared camera display transmits the image toward beam combiner 150. Suitable display types for use as microdisplay 130 include emissive type displays, reflective type displays, and/or transmissive type displays. Suitable emissive displays include electroluminescent displays, vacuum fluorescent displays, field emissive displays and OLEDS (organic LED's). Specific displays suitable for use as microdisplay 130 include, for example, the eMagin SVGA+Rev 3 XL Series, and the Kopin CyberDisplay SVGA LVCR.

In an exemplary embodiment, microdisplay 130 may form a part of a beam combiner assembly of the night vision device 100. An exemplary beam combiner assembly for use with night vision device 100 will be described herein with respect to FIGS. 2-8.

First and second image sources 110 and 120 may desirably generate images corresponding to the same field of view, to combine or fuse the information from both image sources 110 and 120 in a single image for transmission to the user. Thus, it may be desirable for the optical components of first and second image sources 110 and 120 to face in the same direction, and/or be aligned generally parallel to each other in night vision device 100. However, as illustrated in FIG. 1, first and second image sources 110 and 120 may transmit their respective first and second images to beam combiner 150 at a substantially right angle relative to each other, where second image source 120 transmits the second image via microdisplay 130.

While first and second image sources 110 and 120 are described herein as an image intensifier tube and infrared camera, respectively, it will be understood that other image sources may be substituted. Additionally, while the above display has been described in conjunction with an infrared camera, it will be understood that other components may be employed to provide an image on the display. Other suitable image sources for use with the present invention will be understood by one of ordinary skill in the art from the description herein.

Beam combiner 150 receives the first and second images from first and second image sources 110 and 120. Beam combiner 150 further generates a combined image from the first and second images, and transmits the combined image to a user of night vision device 100, as indicated by the combined sets of arrows in FIG. 1. In an exemplary embodiment, beam combiner 150 includes an interface 152 for combining the images from first and second image sources 110 and 120. Beam combiner 150 may be approximately cylindrical in shape, including an axial surface and a radial surface. In this configuration, beam combiner 150 receives the first image through an axial surface of the beam combiner 150, and receives the second image through a radial surface of the beam combiner 150. Beam combiner 150 may be configured to transmit the combined image through another axial surface of the beam combiner 150. Beam combiner 150 may comprise, for example, one or more prisms for reflecting, refracting, or transmitting the images from first and second image sources 110 and 120.

Interface 152 in beam combiner 150 may extend at approximately a 45 degree angle relative to the direction of transmission of the first and second images, as illustrated in FIG. 1. Interface 152 may be configured to reflect, refract, or transmit the light from first and second image sources 110 and 120. For example, interface 152 may be configured to transmit a substantial portion of the first image through beam combiner 150 without refraction or reflection. Interface 152 may further be configured to reflect a substantial portion of the second image at a 90° angle, such that the reflected portion of the second image passes through beam combiner 150 in substantially the same direction as the first image, as illustrated in FIG. 1. Thus, both the first and second image may be combined by the interface 152 for transmission through the rear axial surface of beam combiner 150 to the user. Interface 152 may be carefully selected to determine the relative portions of the first and second image transmitted and reflected, respectively. Interface 152 may comprise, for example, a dichroic filter, or a boundary between two prisms.

In an exemplary embodiment, beam combiner 150 may form a part of a beam combiner assembly of the night vision device 100. An exemplary beam combiner assembly for use with night vision device 100 will be described herein with respect to FIGS. 2-8.

User output 170 receives the combined image from beam combiner 150 and transmits the combined image to a user. In an exemplary embodiment, user output 170 comprises one or more optical elements. Suitable optical elements include, for example, visual or eyepiece lenses. The user output is configured to focus the combined image from beam combiner 150 and transmit the focused image to the user's eye. Thus, night vision device 100 is operable to receive an image from multiple image sources, combine the image, and present the combined image to a user in order to provide the user with enhanced vision in low light or night conditions.

FIGS. 2-8 illustrate an exemplary beam combiner assembly 200 in accordance with aspects of the present invention. As an overview, beam combiner assembly 200 generally includes a microdisplay 230, a beam combiner 250, a housing 252, a display cable connector 270, and one or more light pipes 290. Additional details of beam combiner assembly 200 are described below.

Microdisplay 230 is configured to generate an image and transmit the image to the beam combiner 250. In an exemplary embodiment, microdisplay 230 is microdisplay substantially as described above with respect to microdisplay 130. It will be understood that microdisplay 230 may be adapted to generate an image from sources such as an infrared camera or from other image sources, as described above.

Figure 2:
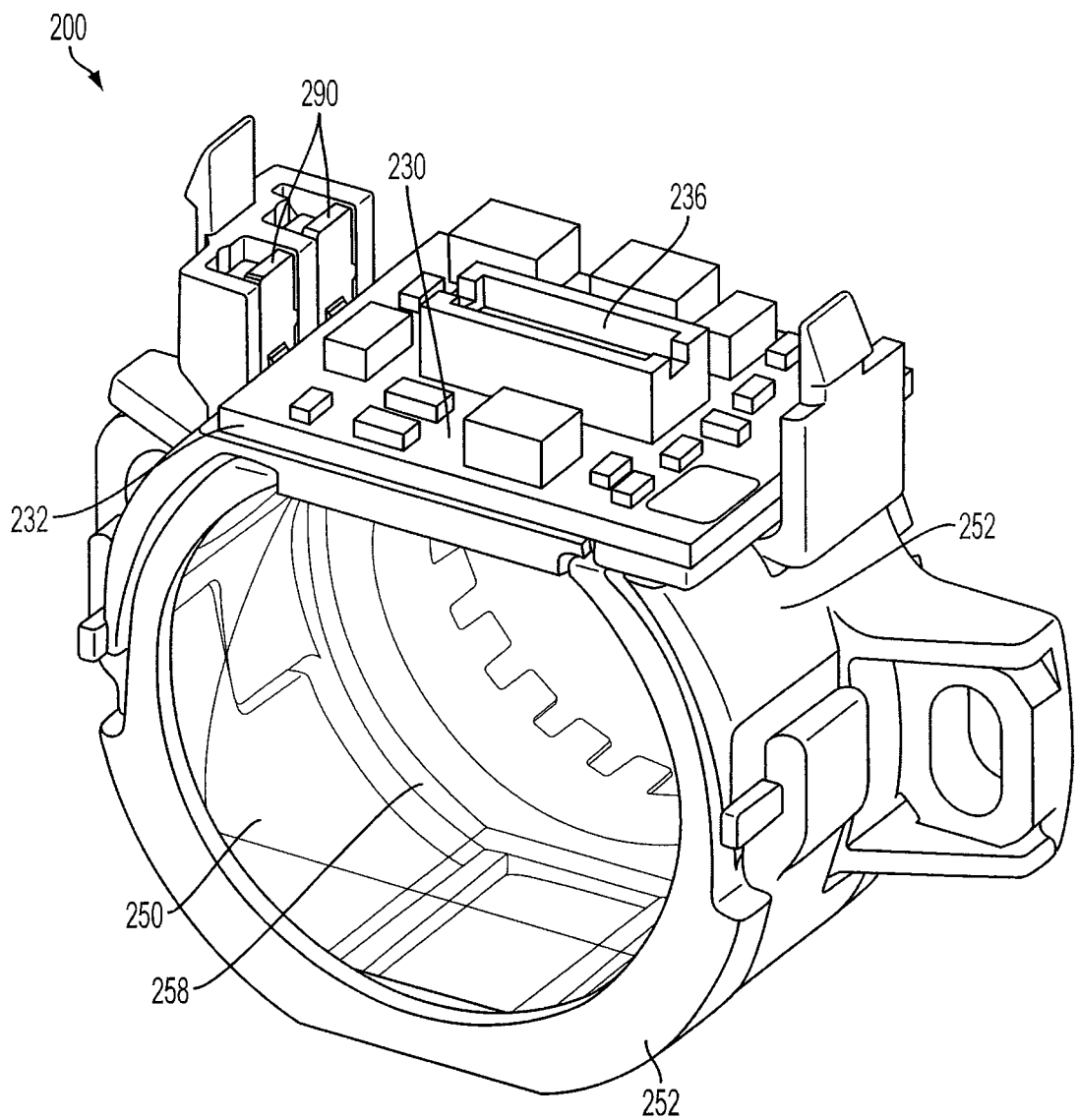
FIG. 2 is an assembled perspective view of an exemplary beam combiner assembly for use with the night vision device of FIG. 1.
Figure 3:
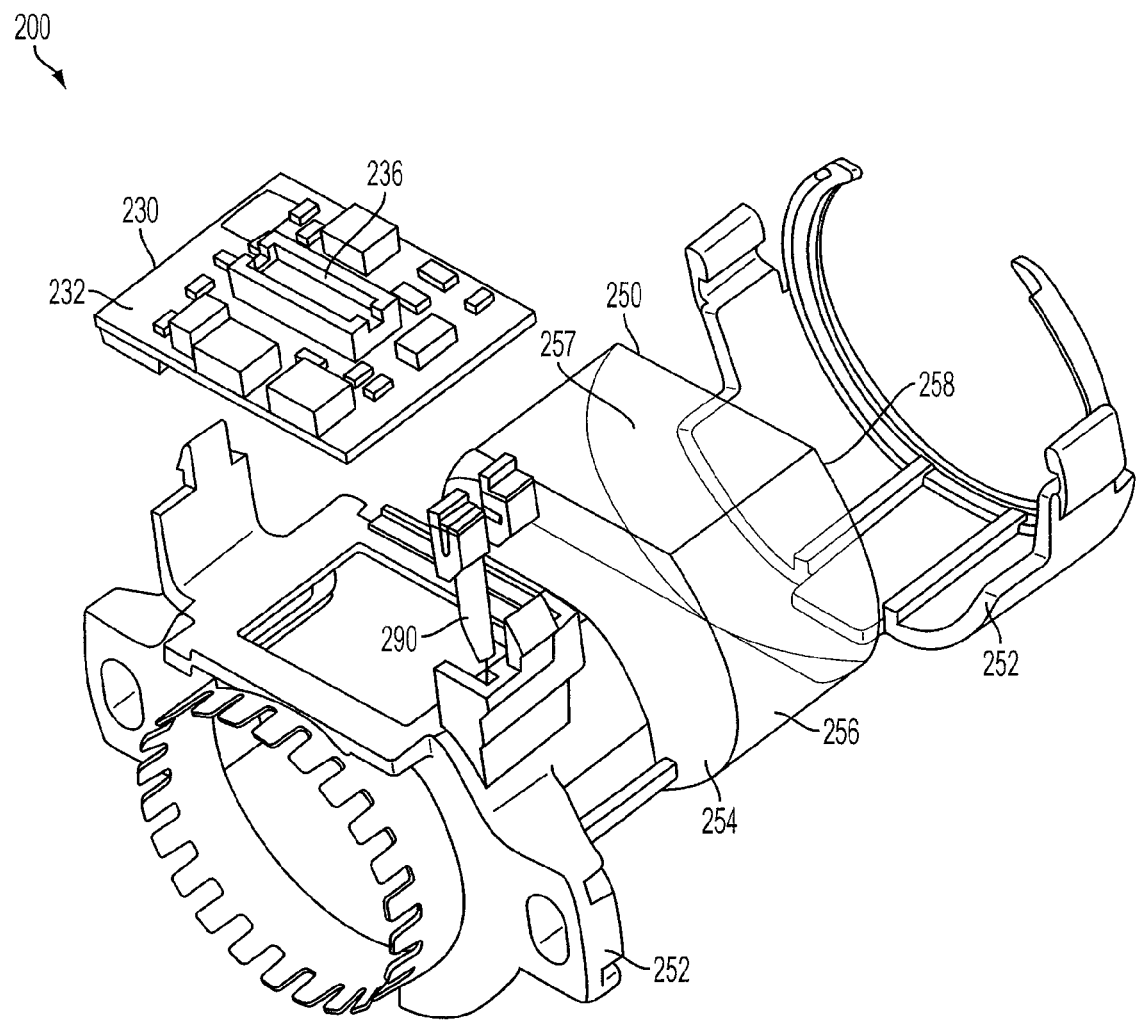
FIG. 3 is an unassembled perspective view of the exemplary beam combiner assembly of FIG. 2.
Figure 4:
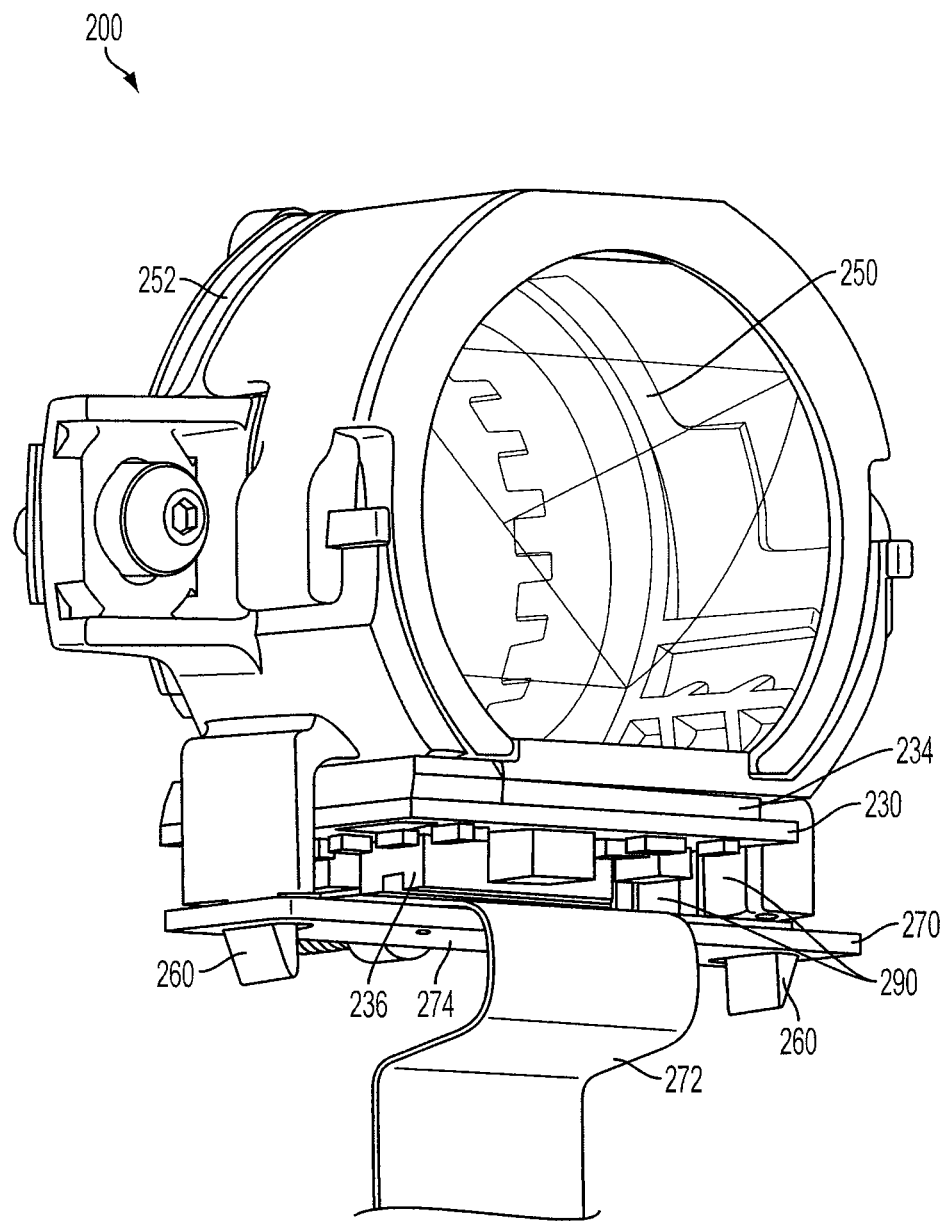
FIG. 4 is a perspective view of an exemplary display connector for use with the beam combiner assembly of FIG. 2.

Microdisplay 230 includes a display substrate 232 that is coupled to the beam combiner 250, as illustrated in FIGS. 2-4. In an exemplary embodiment, display substrate 232 is affixed to beam combiner 250 such that the position of the microdisplay 230 is fixed with respect to the beam combiner. Display substrate 232 may be affixed to a frame 252 of beam combiner 250. Alternatively, the glass element of the microdisplay 230 may be affixed to the beam combiner 250, with the display substrate 232 affixed to the back of the microdisplay 230. Display substrate 232 may further include a number of electronic components for enabling the function of microdisplay 230.

Figure 6:
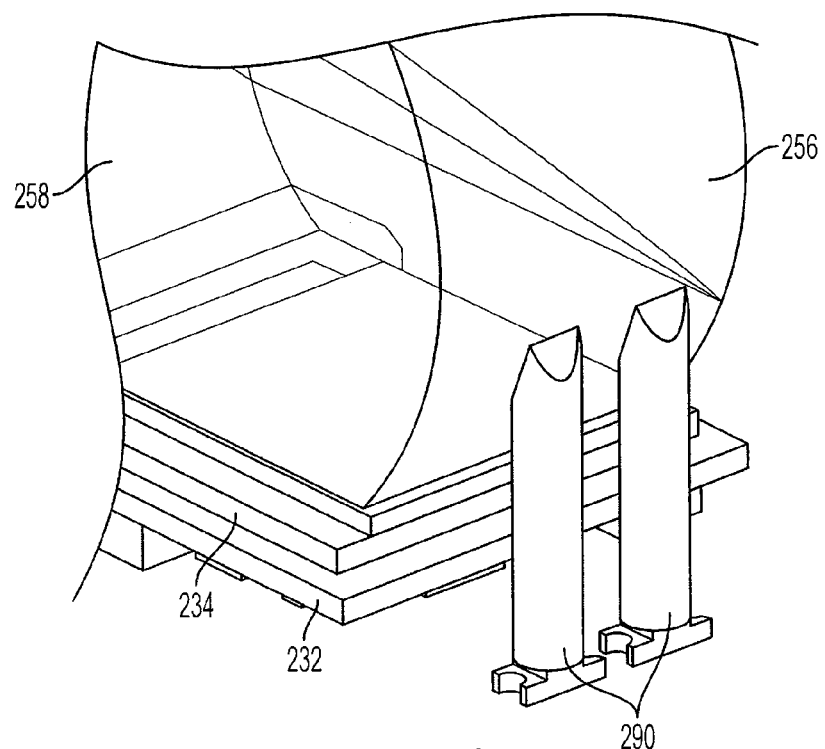
FIG. 6 is a perspective view of exemplary light pipes for use with the beam combiner assembly of FIG. 2.
Figure 7:
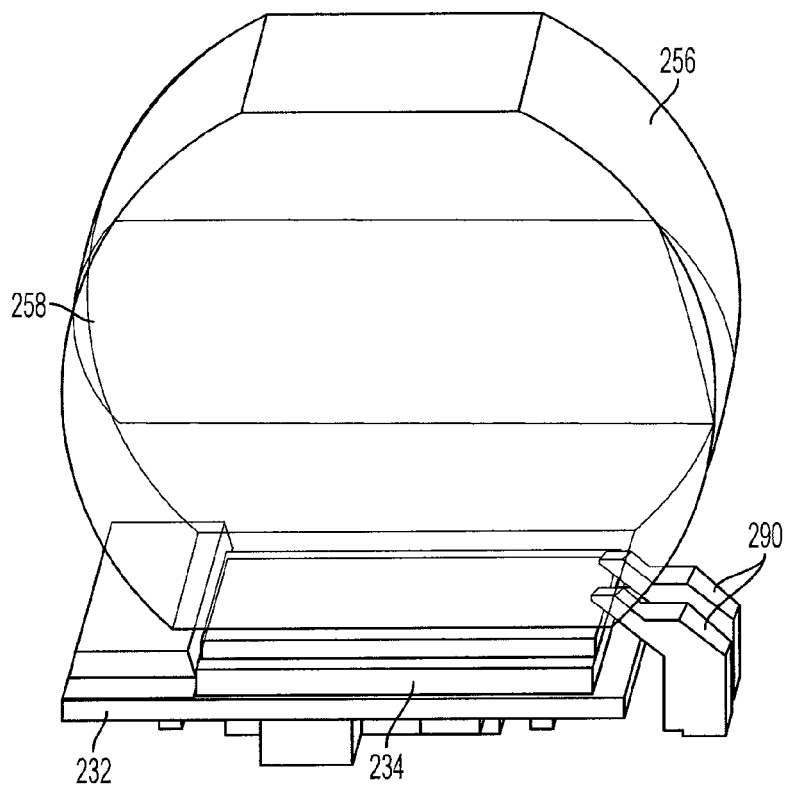
FIG. 7 is a perspective view of alternative exemplary light pipes for use with the beam combiner assembly of FIG. 2.
Figure 8:
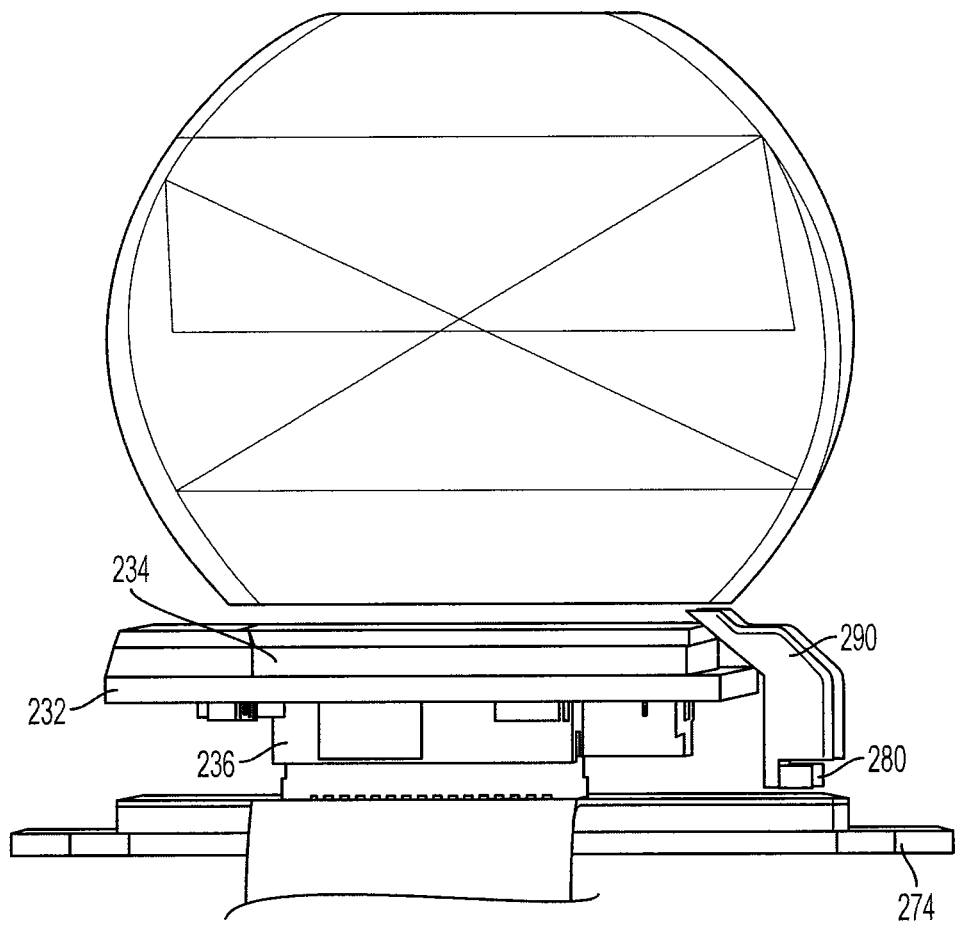
FIG. 8 is a rear view of the exemplary light pipes of FIG. 7.

Microdisplay 230 further includes a display screen 234, as illustrated in FIGS. 6-8. In an exemplary embodiment, display screen 234 transmits the second image to the beam combiner 250. Display screen 234 is mounted to display substrate 232.

Microdisplay 230 further includes a display connector slot 236, as illustrated in FIGS. 2-4. In an exemplary embodiment, display connector slot 236 receives a display cable connector 270. Microdisplay 230 may receive data from the infrared camera or from an associated electronics system via display connector slot 236. Accordingly, microdisplay 230 may display an image based on data received via display connector slot 236.

Beam combiner 250 generates a combined image from the first and second images, and transmits the combined image to a user of the night vision device. In an exemplary embodiment, beam combiner 250 is a beam combiner substantially as described above with respect to beam combiner 150. Beam combiner receives a first image from an image intensifier tube (not shown) and a second image from microdisplay 230. Beam combiner 250 includes an interface (not shown) for combining the first and second images.

Beam combiner 250 includes a frame 252 for holding the beam combiner 250. As illustrated in FIGS. 2-4, beam combiner 250 is approximately cylindrical in shape, including a forward axial surface 254, a radial surface 256, a flat surface 257 adjacent radial surface 256, and a rear axial surface 258. Frame 252 substantially extends around the radial surface 256 and flat surface 257 of beam combiner 250. Frame 252 may comprise one or more pieces.

Beam combiner 250 may receive the first image through forward axial surface 254 and the second image (from microdisplay 230) through flat surface 257, as illustrated in FIG. 3. As described above with respect to device 100, an interface in beam combiner 250 may be configured to transmit a substantial portion of the first image through beam combiner 250, while also being configured to reflect a substantial portion of the second image at a 90° angle, such that the reflected portion of the second image passes through beam combiner 150 in substantially the same direction as the first image. Thus, both the first and second image may be combined by the interface 152 for transmission through the rear axial surface 258 of beam combiner 250 to the user.

Figure 5:
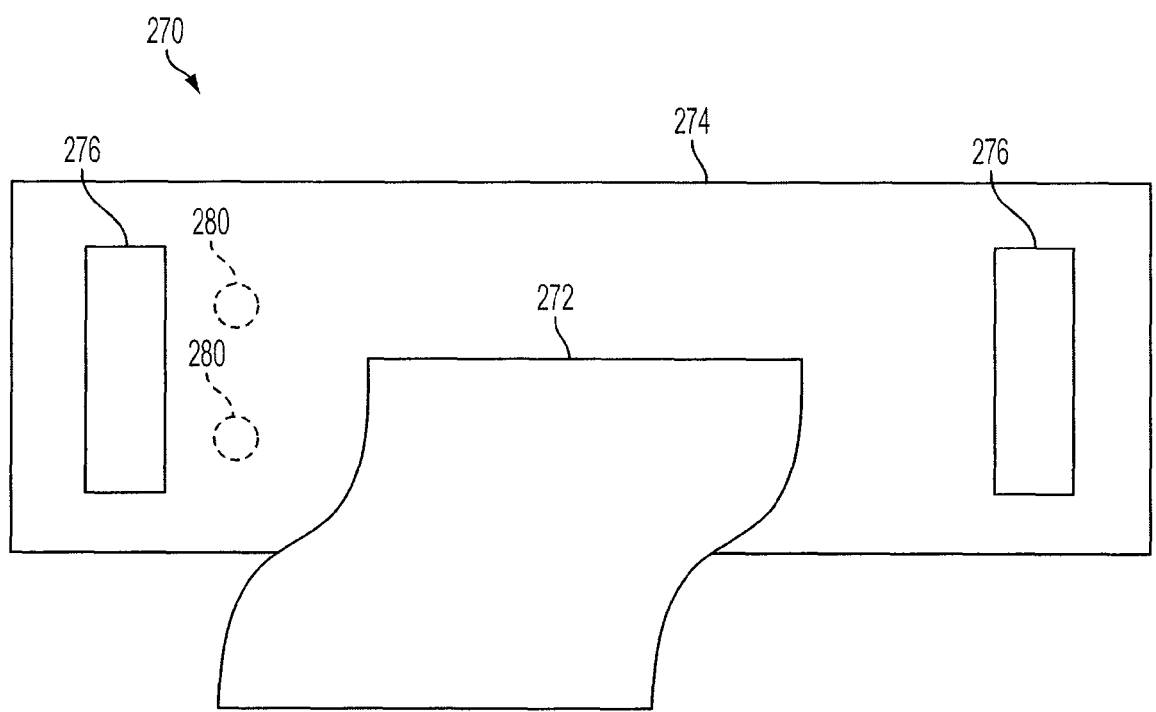
FIG. 5 is an elevation view of the exemplary display connector of FIG. 4.

Display connector 270 is configured to be coupled to the microdisplay 230. In an exemplary embodiment, display connector 270 includes a wire or flex cable 272 that provides data to the microdisplay 230 for generating an image, as illustrated in FIGS. 4 and 5. Display connector 270 may provide sensor data from an infrared camera to microdisplay 230. Microdisplay 230 may then use that data to generate an image and transmit the image to beam combiner 250.

Display connector 270 includes a connector support or stiffener 274 for supporting the attachment of display connector 270 to display connector slot 236. An exemplary connector support 274 is illustrated in FIG. 5. Connector support 274 is coupled to cable 272 of display connector 270. Connector support 274 may further be configured to couple to frame 252 of beam combiner 250. This may desirably provide support such that display connector 270 is not inadvertently disconnected from microdisplay 230. In an exemplary embodiment, frame 252 includes a mounting portion 260. Mounting portion 260 may comprise, for example, one or more snap arms that engage corresponding snap joint holes 276 on connector support 274. Thus, when display connector 270 is connected to microdisplay 230 (via connector slot 236), connector support 274 may be mounted to mounting portion 260 (via mounting holes 276).

Display connector 270 may further include one or more indicator lights 280, as illustrated in FIG. 5. Indicator lights 280 provide indications of the status of the night vision device. For example, at least one of the indicator lights 280 may light up when any one of the image sources of the night vision device has a low battery. Additionally, at least one of the indicator lights 280 may light up to indicate that an indicating IR laser diode is active. Indicator lights 280 may optionally be different colors to provide different status indications. Suitable indicator lights 280 include LEDS.

In an exemplary embodiment, indicator lights 280 are coupled to display connector 270. Indicator lights 280 may be coupled to connector support 274, as illustrated in FIG. 5. Desirably, indicator lights 280 are located on a portion of connector support 274 that faces the beam combiner 250. Thus, when display connector 270 is connected to microdisplay 230, and when connector support 274 is mounted to the frame 252 of beam combiner 250, then indicator lights 280 face toward beam combiner 250. Indicator lights may be coupled to receive power from cable 272 of display connector 270. Additional information regarding the position of indicator lights 280 will be provided herein.

While indicator lights 280 are illustrated as coupled to display connector 270, it will be understood that indicator lights 280 may be positioned elsewhere within the housing of the night vision device. In one exemplary embodiment, indicator lights are mounted to the frame 252 of the beam combiner assembly 200. In an alternative embodiment, indicator lights 280 may be mounted to the display substrate 232. The indicator lights may desirably be positioned on the surface of the display substrate 232 facing the beam combiner 250, such that the indicator lights 280 transmit light to the beam combiner 250.

Light pipes 290 are coupled to the beam combiner 250. The number of light pipes may correspond to the number of indicator lights 280. In an exemplary embodiment, light pipes 290 are mounted in positions such that each light pipe 290 will receive the light from a respective indicator light 280 when the display connector 270 is coupled to the microdisplay 230. Light pipes 290 may be mounted to the frame 252 of beam combiner 250, in positions adjacent to or surrounding the microdisplay 230, as illustrated in FIGS. 2, 4, and 6-8. Light pipes 290 may further be positioned in locations corresponding to the locations of indicator lights 280.

Light pipes 290 may be formed as hollow or solid waveguides configured to transmit light from one end to another. Suitable materials for forming light pipes 290 include clear polycarbonate and other optical quality plastics.

Light pipes 290 may be configured to receive all of the light from their respective indicator lights 280, such that no stray light from indicator lights 280 escapes from the light pipes 290 into the night vision device. Light pipes 290 may therefore include hollow portions or concavities on the ends located adjacent or over indicator lights 280. In this configuration, when connector support 274 is mounted to the frame 252 of beam combiner 250, indicator lights 280 may be disposed inside the concavities in light pipes 290, such that all of the light from indicator lights 280 is emitted into light pipes 290.

In the above-described exemplary embodiment, light pipes 290 are further configured to transmit the light from respective indicator lights 280 to the beam combiner 250. Thus, light pipes 290 extend from connector support 274 to beam combiner 250.

The location and direction at which light pipes 290 transmit light may affect how the indicator lights 280 are viewed by a user of the night vision device. In an exemplary embodiment, light pipes 290 may contact the radial surface 256 of beam combiner 250 such that light pipes 290 transmit the light from indicator lights 280 through the radial surface 256 of the beam combiner.

In one such embodiment, light from indicator lights 280 is transmitted such that it is visible at a perimeter of the combined image transmitted by the beam combiner assembly 200. The light pipes 290 may transmit the light to the beam combiner 250 such that the light enters the beam combiner 250 going in a substantially circumferential direction, as illustrated in FIG. 6.

In another such embodiment, light from indicator lights 280 is transmitted such that it is visible just outside of the display image transmitted by the beam combiner assembly 200. The light pipes 290 may transmit the light to the beam combiner 250 such that the light enters the beam combiner 250 going in a substantially radial direction to provide focused indicators, as illustrated in FIGS. 7 and 8.

The degree of focus of the light transmitted by light pipes 290 may also affect how the indicator lights 280 are viewed by a user of the night vision device. In one embodiment, light pipes 290 are configured to transmit the light such that the light diffuses throughout the combined image transmitted by the beam combiner assembly 200. In another embodiment, light pipes 290 are configured to transmit the light such that the light is focused at a single point in the combined image transmitted by the beam combiner assembly 200. The degree of focus if the light may be determined by the location and orientation of the exit aperture of the light pipes, the structure of the light pipes, the materials used, and the use of any reflective coatings on the light pipes, as would be understood by one of ordinary skill in the art from the description herein.

The exemplary night vision devices and related components of the present invention may be desirable for use in place of night vision devices having external indicator lights. For example, a night vision device may have an indicator light mounted on an exterior housing surface of the night vision device. Use of such an indicator light may have shortcomings. In order to view the indicator light, the user must look away from the field-of-view of the eyepiece, and look at the indicator light. After looking at the indicator light, the user may then resume viewing the field-of-view through the eyepiece, but possibly only after a time consuming eye-focusing adjustment. In addition, an indicator light mounted on the exterior surface of the night vision device may potentially give away the user's position. To overcome these shortcomings, the exemplary night vision devices disclosed herein use internal indicator lights, that do not require a user to look away from their field of vision.

The exemplary night vision devices and relates components of the present invention may further be desirable for use in place of night vision devices having indicator lights integrated with image intensifier tubes. The image intensifier tubes of such devices may be overly complicated to manufacture, or may be more likely to break. To overcome these shortcomings, the exemplary night vision devices disclosed herein integrate the indicator lights with the display connector and beam combiner assembly, where they may be more easily manufactured or replaced.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A beam combiner assembly comprising: a beam combiner configured to generate a combined image by combining a first image from a first imager and a second image from a second imager, the beam combiner further configured to transmit the combined image onto a display to a user; at least one indicator light, including an LED, mounted on a surface for visually alerting the user of an operating status of either the first imager or the second imager, wherein when the at least one indicator light is ON, a visual alert as rays of light is provided to the user directly from the at least one indicator light; one or more light pipes, configured as individual waveguides for moving rays of light from one location to another location, positioned between the at least one indicator light and the beam combiner, wherein each light pipe is configured to receive the visual alert as rays of light from a respective indicator light and transmit the visual alert as rays of light to the beam combiner for further transmission of the visual alert onto the display to the user; wherein each light pipe is configured to receive light from a respective indicator light, and each light pipe is configured to transmit the light from the respective indicator light to the beam combiner.

2. The beam combiner assembly of claim 1, wherein
   the beam combiner is configured to transmit the combined image to a user through an axial surface of the beam combiner, and
   the one or more light pipes are configured to transmit the light to a radial surface of the beam combiner.

3. The beam combiner assembly of claim 1, wherein
   the one or more light pipes are configured to transmit the light such that the indicators are visible at a perimeter of the combined image transmitted by the beam combiner.

4. The beam combiner assembly of claim 1, wherein the one or more light pipes transmit the light to the beam combiner in a substantially circumferential direction.

5. The beam combiner assembly of claim 1, wherein the one or more light pipes are configured to transmit the light such that the indicators are visible outside of the combined image transmitted by the beam combiner.

6. The beam combiner assembly of claim 1, wherein the one or more light pipes transmit the light to the beam combiner in a substantially radial direction.

7. The beam combiner assembly of claim 1, wherein the one or more light pipes are configured to transmit the light such that the light diffuses throughout at least a portion of the combined image transmitted by the beam combiner.

8. The beam combiner assembly of claim 1, wherein the one or more light pipes are configured to transmit the light such that the light is focused at a single point in the combined image transmitted by the beam combiner.

9. The beam combiner assembly of claim 1, further comprising:
   a user optical output,
   wherein the beam combiner is configured to transmit the combined image to the user optical output, and
   the user optical output is configured to focus the combined image and transmit the combined image to the user.

10. The beam combiner assembly of claim 1, further comprising a frame configured to hold the beam combiner, wherein
   the one or more light pipes are mounted to the frame.

11. The beam combiner assembly of claim 10, further comprising:
   a display configured to generate the second image and transmit the second image to the beam combiner, the display including a display connector slot; and
   a display connector adapted to couple to the display connector slot of the display, the display connector including the one or more indicator lights.

12. The beam combiner assembly of claim 11, wherein the frame includes a mounting portion, and
   the display connector mounts to the mounting portion of the frame when the display connector is coupled to the display.

13. The beam combiner assembly of claim 12, wherein the mounting portion comprises snap arms.

14. The beam combiner assembly of claim 1, wherein each light pipe is configured to receive all of the light from the respective indicator light when the display connector is coupled to the display.

* * * * *